July 15, 1941.  J. A. THOMAS  2,249,262
PROCESS FOR CONTROLLING BACTERIAL ACTIVITY DURING MAKING OF WINE
Filed Aug. 27, 1938
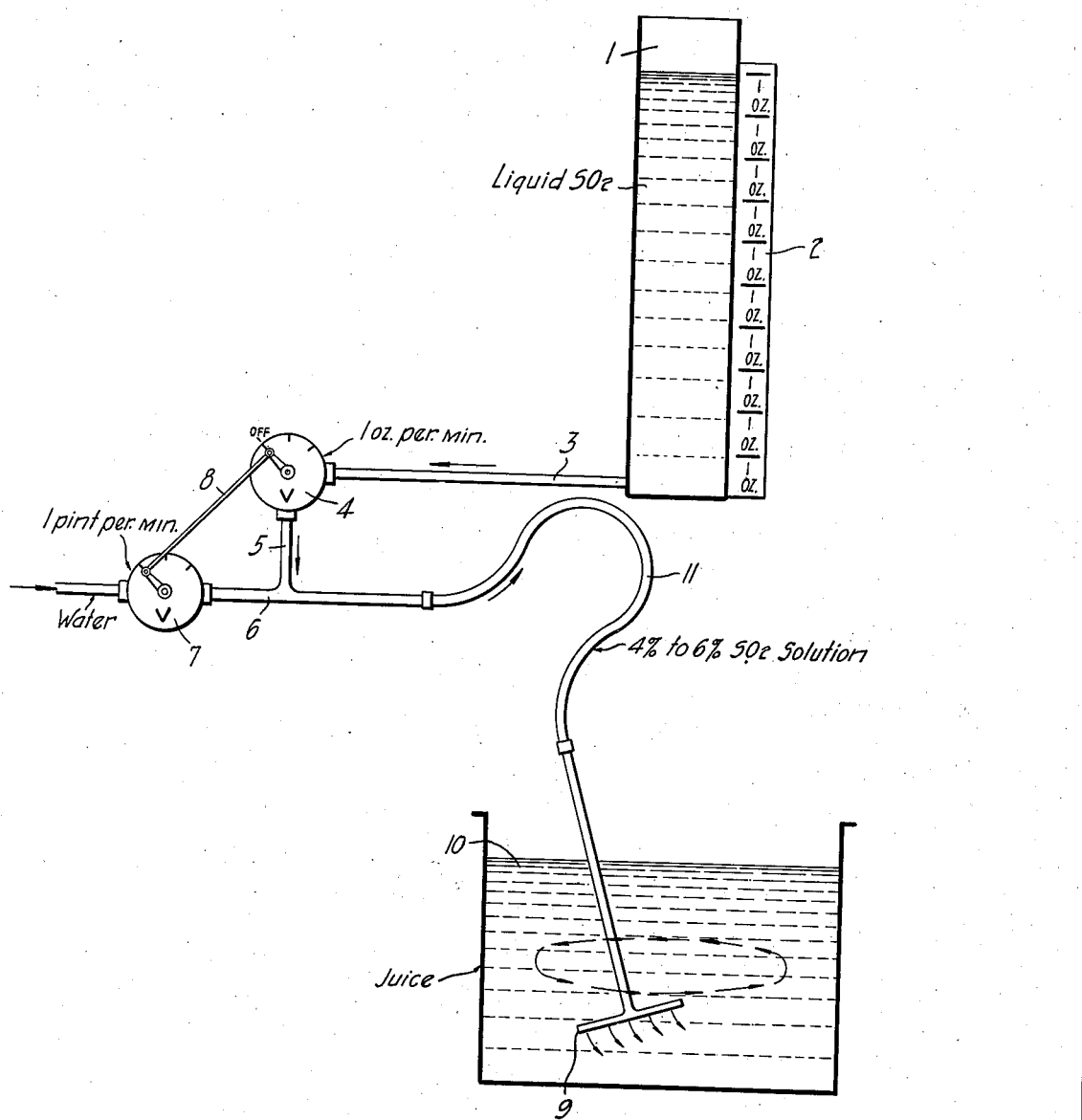
INVENTOR
James A. Thomas
BY
Boyken & Mohler
ATTORNEYS.

Patented July 15, 1941

2,249,262

UNITED STATES PATENT OFFICE 2,249,262

PROCESS FOR CONTROLLING BACTERIAL ACTIVITY DURING MAKING OF WINE

James A. Thomas, Berkeley, Calif., assignor to Esotoo Fumigation Co. Ltd., San Francisco, Calif., a corporation of California Application August 27, 1938, Serial No. 227,160

3 Claims. (Cl. 99—35)

This invention relates to wine making and has for its objects the process of treating the freshly expressed fruit juice, such as grape juice, with $SO_2$ gas for rendering the undesirable wild yeast and mold species inactive without retarding the activity of the true wine yeast, (Saccharomyces ellipsoideus) thereby reducing the possibility of spoilage due to bacterial action and also producing a wine of lower volatile acidity and better color. Another object of the invention is an improved process for quickly and efficiently mixing $SO_2$ with the freshly expressed fruit juice at about or during fermentation and more efficiently distributing the $SO_2$ in the juice, without causing undesirable odors and without wastage of the $SO_2$ and without danger of overtreatment of the juice, and a still further object is the continuous production of a solution of $SO_2$, in water, in proper concentration, immediately prior to the injection of the solution into the juice.

Other objects and advantages will appear in the description and drawing annexed hereto.

The drawing is a diagrammatic showing of one method of carrying out the process.

The addition of $SO_2$ to crushed grapes or juice from crushed grapes is an established winery practice. The fermentation of must, or juice, is brought about by an enzyme, alcoholase, or zymase produced by living yeast. The true wine yeast, Saccharomyces ellipsoideus, produces this desirable enzyme more abundantly than does other species of yeast, commonly known as "wild yeast." These wild yeasts secrete other enzymes which, through their action, produce undesirable chemical compounds.

These compounds are produced instead of ethyl alcohol and the other desirable constituents which make up the characteristic flavor and bouquet.

Sulphur dioxide, added in proper proportions to freshly crushed grapes, or expressed juice, inactivates the wild yeast and mold species without retarding the activity of the true wine yeast (Saccharomyces ellipsoideus) and a cleaner, more desirable fermentation results when the $SO_2$ is used during fermentation.

The control of bacteria during fermentation, by retarding the growth and activity of such bacteria, is effected by mixing $SO_2$ with the juice, which control results in a wine of lower volatile acidity and the $SO_2$ also reduces the activity of oxidase enzymes, thereby producing a wine of a superior quality and since the $SO_2$ added to the must during fermentation is partially carried over into the wine produced, the finished wine is protected from bacterial spoilage, which protection lasts as long as sufficient $SO_2$ is in the wine.

Heretofore liquid $SO_2$ has been added to the wine direct, but this method is not desirable due to the impossibility of procuring a satisfactory distribution of the $SO_2$ in the juice, and due to the tendency to overtreat the wine in order to obtain perceptible results. Also the liberation of the volatilized $SO_2$ in the air causes a highly disagreeable odor throughout the wineries.

Potassium metabisulfite has been used, but this contains only about 50% $SO_2$ and deteriorates, particularly under moist conditions.

Since the entire weight of liquid $SO_2$ is effective, this is by far the most desirable form for use, and by my method, hereinafter described, its use is easy, accurate, efficient, and there are no undesirable odors resulting from such use.

Referring to the drawing, the supply of liquid $SO_2$ is in a supply tank 1, which tank may be suitably calibrated for weight as at 2, as in ounces, pounds, or the like, for visibly indicating how much $SO_2$, by weight, is being drawn therefrom.

A pipe line 3 from the tank leads to a constant delivery valve 4 from which valve a pipe line 5 leads to a water pipe 6, water being delivered to said water pipe through a constant delivery valve 7 from any suitable source, such as a water main or tank. The valves themselves are preferably marked to indicate the amount of constant delivery to the discharge side, for example, valve 4 may be marked to indicate the ounces or pounds per minute of $SO_2$ delivered therefrom while valve 7 may indicate the pints, quarts, etc., delivered from the constant delivery side. The valves may be connected by a link 8, so that upon moving the link to open valve 4 to the point for delivering 1 ounce per minute, the water valve will open to deliver 1 pint of water per minute and thus at the discharge nozzle 9 of the water line, a solution comprising 1 ounce of $SO_2$ to 1 pint of water will be discharged in one minute from the nozzle and the operator can readily observe from the gage 2 when one ounce of $SO_2$ has passed to the nozzle.

In actual practice, if the water is relatively cool, one ounce of $SO_2$ to 1 pint of water, produces a 6% $SO_2$ solution, whereas if the water is relatively warm, as in hotter climates, the solution is between about 4% and 6% and such solution has no odor.

Where the water is fairly warm, and a 4% $SO_2$ solution is produced, about 5⅓ ounces of $SO_2$ is used for each gallon of water, whereas with cooler water about 8 ounces of $SO_2$ will produce a 6% solution.

In the making of red wine, I have found that the addition of from two to six ounces of $SO_2$ per ton of grapes during the crushing or immediately after, produces the desired results. About one ounce of $SO_2$ per ton is equivalent to about five to seven ounces per 1000 gallons of must. If the grapes are sound and clean, from three to four ounces of $SO_2$ per ton is sufficient, but if the fruit is moldy and vinegar soured, from four to six ounces is preferable. Each ton of grapes is estimated to produce approximately 200 gallons of crushed grapes.

By my process, the nozzle 9 is inserted into a known amount of juice 10, say two hundred gallons of crushed grapes, for example and the valves 4, 7 are opened. The number of ounces of $SO_2$ passing into the water is readily determined by observing the gage. The $SO_2$ passes into the water in pipe 6 and then through hose 11 to nozzle 9, mixed with the water at the rate of one ounce of $SO_2$ to one pint of water. The nozzle 9 is moved around in the crushed grapes and at the same time evenly distributes the 6% $SO_2$ solution in the water, which solution will be about 2½ to 3½ pints. If the fruit is moldy or soured or partly fermented, about 6 to 7 pints of solution should be mixed with each ton, or 200 gallons of crushed grapes.

Since the production of the $SO_2$ solution is substantially simultaneous with the ejection of the solution into the juice or crushed grapes, it is obvious that there is no deterioration of the solution, as occurs where it is allowed to stand, as a solution in storage. Also there is no odor, since the $SO_2$ is completely taken up in the water and the distribution of the $SO_2$ is more thorough than could be obtained by injecting the straight $SO_2$ into the juice.

It is obvious that the $SO_2$ drawn from the source of supply and passing into the juice, will be the same whether or not the solution is more or less than 6%, but the addition of too weak a solution is undesirable since it means that just that much water is added to the juice, and if less water is used, the gas will not go into solution and will result in undesirable odors.

The main feature of my process is therefore the continuous making of an $SO_2$ solution with the injection of such solution directly into the expressed fruit juice and its distribution in such juice. The control of the concentration produced is important in that the desirable results are obtained only by such control and the amount of solution injected is important since the amount likewise determines the character of the results obtained.

Having described my invention, I claim:

1. The process of making wine from must containing natural wine yeast, *Saccharomyces ellipsoideus*, together with undesirable wild yeasts, molds and bacteria normally present in must during fermentation thereof that includes the steps of mixing an aqueous solution of liquid $SO_2$ with said must in the ratio of substantially from 2 to 6 ounces by weight of liquid $SO_2$ to the must produced from each ton of grapes, thereby substantially inactivating the undesirable wild yeasts, molds and bacteria while permitting substantially unretarded activity by the said natural wine yeast, and thereafter permitting fermentation of said must under the predominating influence of said natural wine yeast.

2. In the process of making wine from a body of must that contains active natural wine yeast, together with active wild yeasts, molds and bacteria, that includes the step of inactivating such wild yeasts, molds, and bacteria while preserving the natural wine yeast in active condition, by mixing with said must about a 4% to 6% $SO_2$ solution of water and liquid $SO_2$ in the ratio of substantially 4 to 7 pints of said solution to each 200 gallons of must.

3. In the process as defined in claim 2, said solution being maintained at all times before and during injection into said must, out of contact with atmospheric air and the injection of said solution into said body of must being effected below the level of said body, whereby all of the $SO_2$ in said solution at the time making the same will be direct contact with the must.

JAMES A. THOMAS.